United States Patent [19]

Wang

[11] Patent Number: 5,318,701
[45] Date of Patent: Jun. 7, 1994

[54] TANDEM PUMP/FILTER FOR AQUARIUM

[75] Inventor: Chung C. Wang, Taipei Hsien, Taiwan

[73] Assignee: Art-Full Co., Ltd., Taipei Hsien, Taiwan

[21] Appl. No.: 127,079

[22] Filed: Sep. 27, 1993

[51] Int. Cl.⁵ ............................................. A01K 63/04
[52] U.S. Cl. .................................. 210/169; 210/220; 210/416.2; 210/418; 210/420; 415/121.2; 119/261
[58] Field of Search .......................... 417/423.1, 423.5; 415/121.2; 210/169, 220, 416.2, 418, 420; 119/259, 261

[56] References Cited

U.S. PATENT DOCUMENTS 5,006,238  4/1991  Tominaga ............................ 210/169
5,131,821  7/1992  Marioni et al. ..................... 210/169

*Primary Examiner*—Peter A. Hruskoci
*Assistant Examiner*—Robert James Popovics
*Attorney, Agent, or Firm*—Browdy and Neimark

[57] ABSTRACT

A tandem pump equipped with a pair of pump units that are assembled together each having a water inlet and a water outlet. Each water outlet duct is associated with a control chamber which is equipped with a volume control disc which can be operated with click sound. Each water outlet duct is provided an air intake tube with which flexible pipe can be engaged so that air or different kinds of gas can be introduced into water of a fish globe along with the projected water. The pump umits of the tandem pump are in communication with each other so that water can be controllably dispensed via a single water outlet or both water outlets at variable speed or volume. Different kinds of accessories for fish raising can be selectively mounted to both or either of the pump units so as to make the tandem pump to be more effectively employed.

5 Claims, 10 Drawing Sheets

TANDEM PUMP/FILTER FOR AQUARIUM

BACKGROUND OF THE INVENTION

The present invention relates to an underwater pump and particularly to a tandem pump which is provided with two symmetrically disposed pump units. To each pump unit can be attached a different or similar water processing accessory; and each pump unit is provided with a volume adjusting device having a plurality of engagement protrusions disposed on the underside periphery thereof and selectively engaged with a plurality of corresponding retaining recesses disposed on the top periphery of a control device so as to produce click sound as the adjusting device is actuated to vary the volume of the flow.

There are a plurality of first communication ports disposed on the control disc and defined in conformance to a plurality of second communication ports disposed on an adjusting board. By turning the control disc against the adjusting board, the first and second communication ports can come into full alignment with or go fully out of alignment with each other or at positions in between, resulting in the variation of volume of the inlet water.

As shown in FIG. 1, the conventional water pump has only one pump unit which is made up of a motor 1A, a propeller 3A having a plurality of blades 31A, a top adjusting means 32A, a control chamber 33A having a control slide door 35A and a bottom adjusting disc 34A, and a filter accessory 36A which is associated with the pump. It can be clearly seen that the prior art pump has only one water inlet 341 and outlet 332 and the volume control means uses merely one port and the water volume can be controlled by turning the bottom disc 34A against the control chamber so as to vary the degree of the alignment of the port 341 and one of the ports 331 of the control chamber 33A.

The prior art pump can be engaged with only one water processing accessory, and it becomes inconvenient as more than one accessory is required in one aspect, and the volume adjusting means is designed in such a manner that it is not effectively operated in another aspect.

SUMMARY OF THE INVENTION

The primary object of the present invention is to provide a tandem pump which can be associated with different kinds of water processing accessories so as to better improve the quality of water.

Another object of the present invention is to provide a tandem pump which is provided with water volume adjusting means operated with click sound.

One further object of the present invention is to provide a tandem pump which is provided with air intaking means at each water outlet duct so as to permit air or different kinds of gas to be introduced into water.

DETAILED DESCRIPTION OF THE PREFERRED EMBODIMENTS

Figure 1:
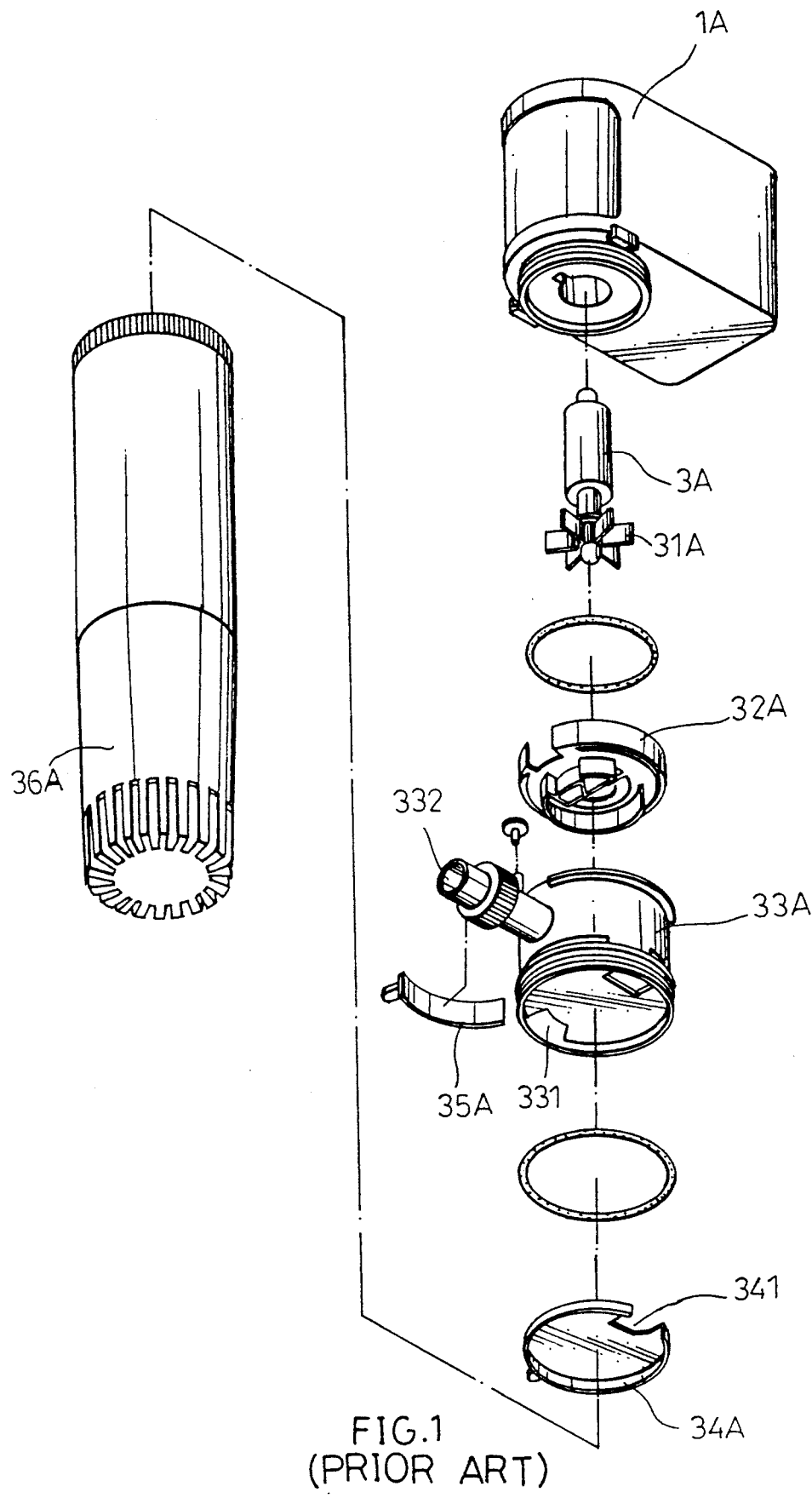
FIG. 1 is a perspective diagram showing the exploded components of a prior art pump.
Figure 2:
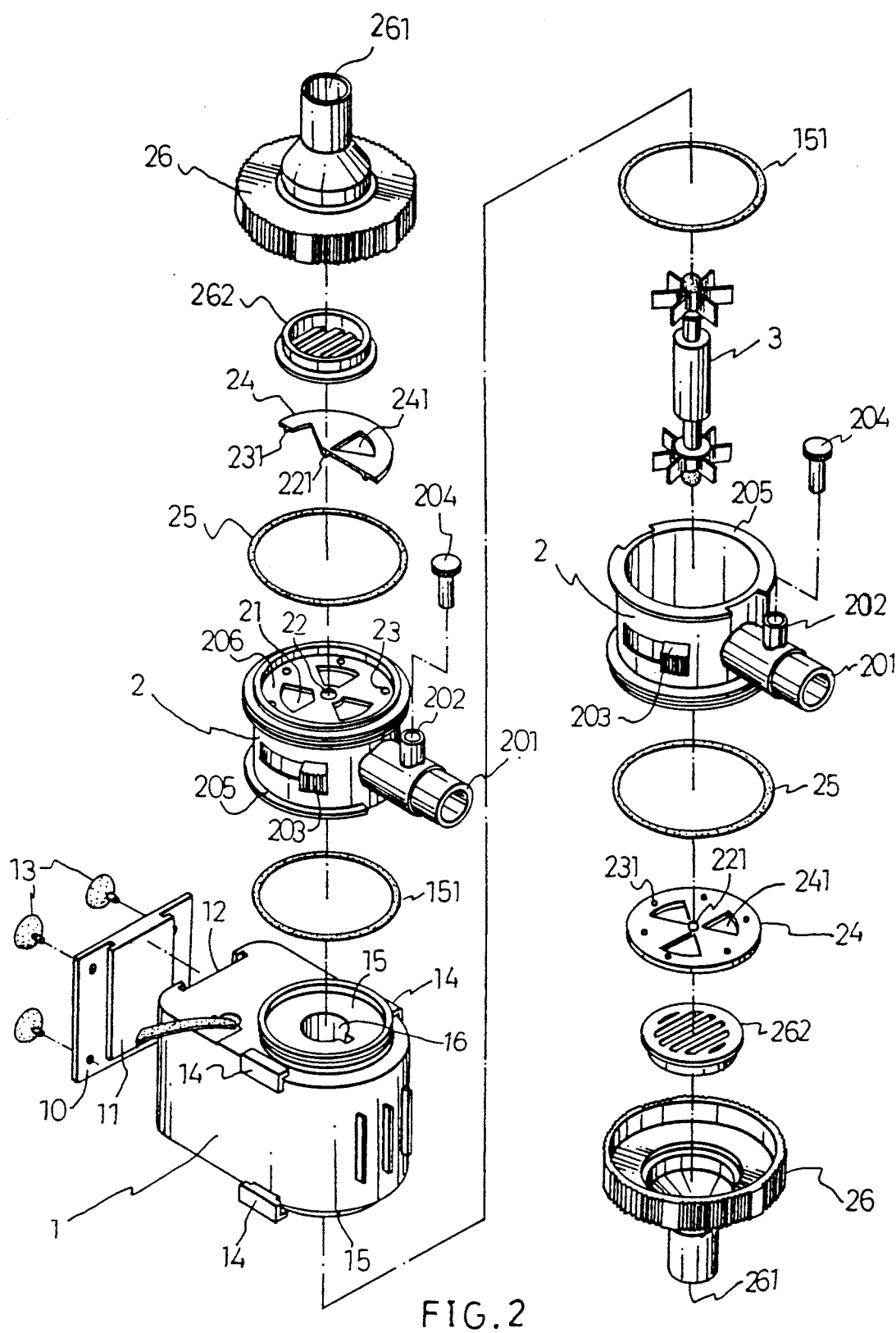
FIG. 2 is a perspective diagram showing the exploded components of the present tandem pump.
Figure 3:
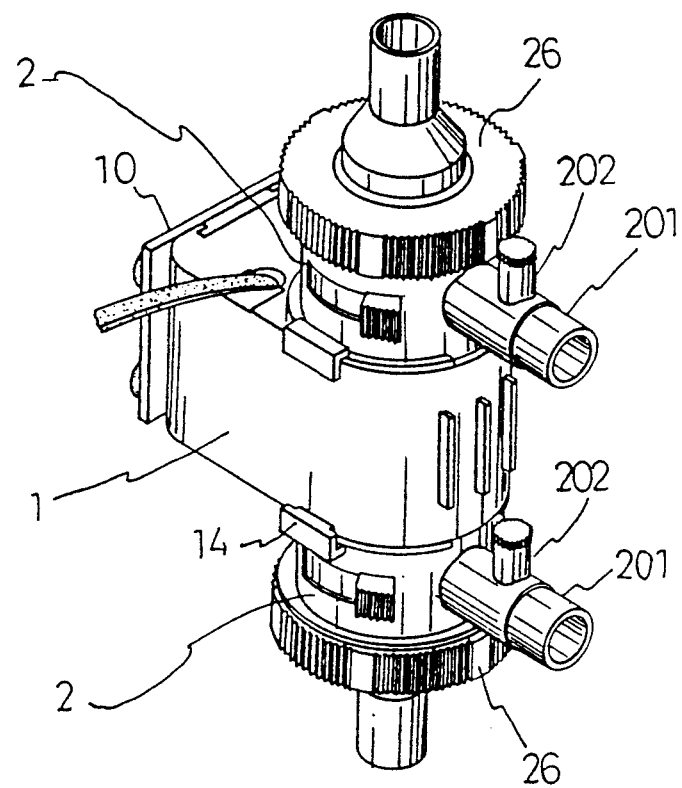
FIG. 3 is a perspective diagram showing the assembled tandem-pump of the present invention.
Figure 4:
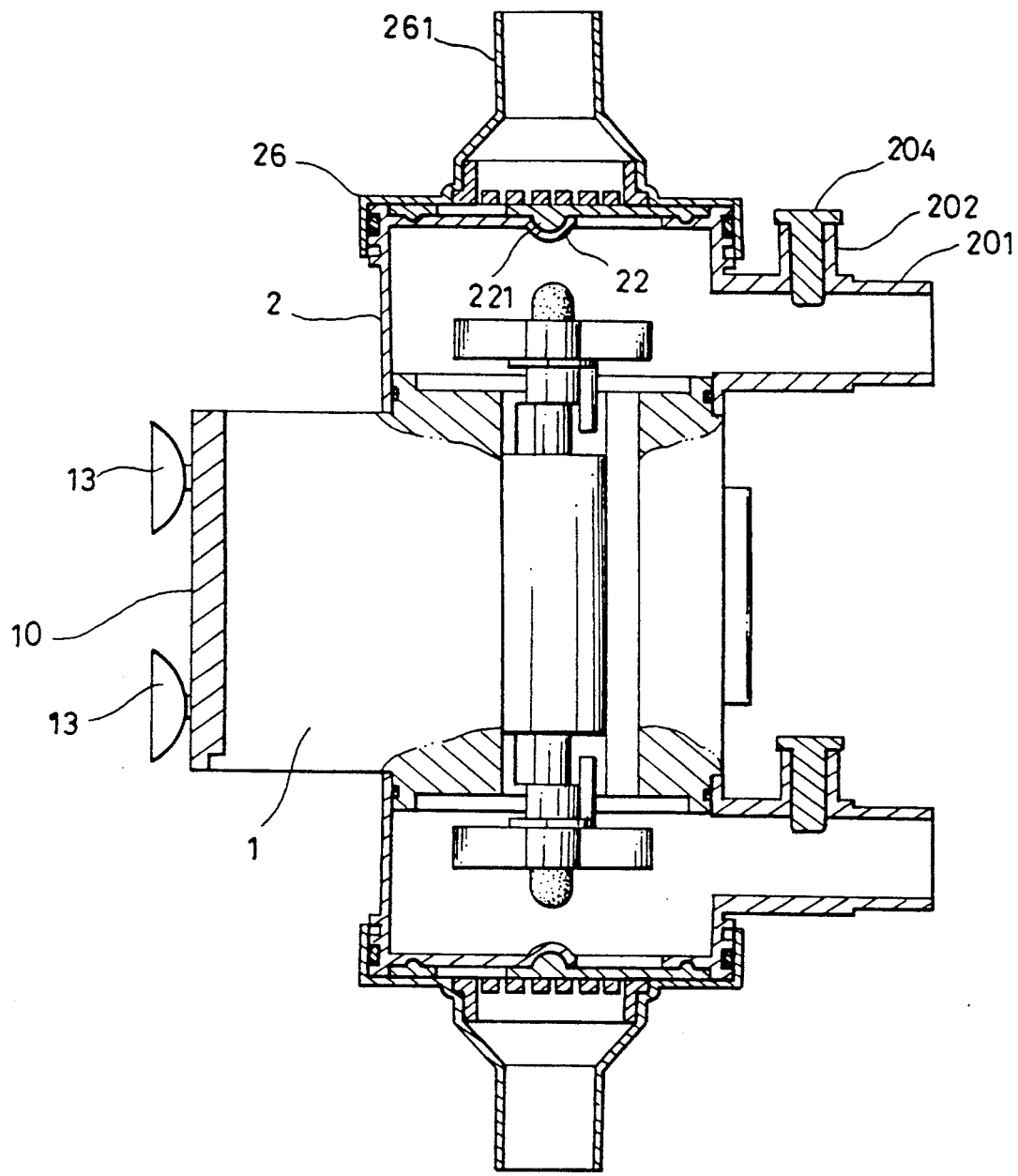
FIG. 4 is a sectional view showing the inner structure thereof.

Referring to FIGS. 2, 3, the tandem pump of the present invention is comprised of a motor 1 and a pair of pump units.

The motor 1 has a central through hole 16 in which a magnetically driven propeller 3 can be housed and the rear of the motor 1 is provided with a retaining groove 12 which permits a fixing board 10 having an engagement piece 11 and a number of air-actuated sticking members 13 to be secured to the wall of a fish globe. A vertically defined and peripherally threaded circular flange 15 is disposed on each upper or lower side of the motor 1, and a pair of retaining members 14 are fixed to the periphery of the upper and lower sides of the motor 1.

A sealing ring 151 is engaged with the flange 15 first and then an upper control chamber 2 having a horizontal securing flange 205 disposed along the bottom periphery thereof is secured to the flange 15 with the securing flange 205 engaged with the retaining members 14.

The top of the control chamber 2 is provided with a volume adjusting board 206 having three communication ports 21 thereon and the chamber has an opened bottom end so as to permit one end of the propeller 3 to be received therein.

There is an water outlet duct 201 in communication with the control chamber 2 and an air intake tube 202 is in communication with the water outlet duct 201. On the wall of the control chamber 2 is disposed an outlet volume control button 203 which can be horizontally pivoted so as to vary the degree of opening of the duct 201. Along the periphery of the volume adjusting board 206 is provided with a plurality of spaced recesses 23.

At the center of the control board 206 is disposed a half sphere recess 22. Associated with the volume control board 206 is a control disc 24 having three symmetrically disposed communication ports 241 thereon in conformance to the communication ports 21 on the adjusting board 206. A sealing ring 25 is mounted to the top of the control chamber 2.

On the underside of the disc 24 is disposed a center protrusion 221 engaged with the corresponding half sphere recess 22; and along the periphery of the underside of the disc 24 are also provided with a plurality of protruded spots 231 in correspondence to the recesses 23. On top of the disc 24 is placed a filter member 262, and then a cap 26 having a water inlet duct 261 is in locking engagement with the control chamber 2.

As the motor 1 of the tandem pump is actuated to operate, the magnetically driven propeller shaft 3 is forced to spin so as to take water into the pump units via the respective water inlet duct 261 and is further led through the filter 262 and the adjusting disc 24.

The adjusting disc 24 associated with the cap 26 and centered at the half sphere recess 22 is movable with respect to the adjusting board 206. The adjusting board 206 can be put in a totally opened state as the ports 241 are moved into alignment with the ports 21 on the adjusting board 206; and can be put in a totally closed state, as the ports 241 are turned completely out of alignment with the ports 21.

There are theoretically infinite different positions at which the control disc 24 can be turned with respect to the adjusting board 206 between the totally closed and opened positions so as effect the varition of the volume of the water flowing into each control chamber 2 and discharged out of the water outlet duct 201.

Figure 5A:
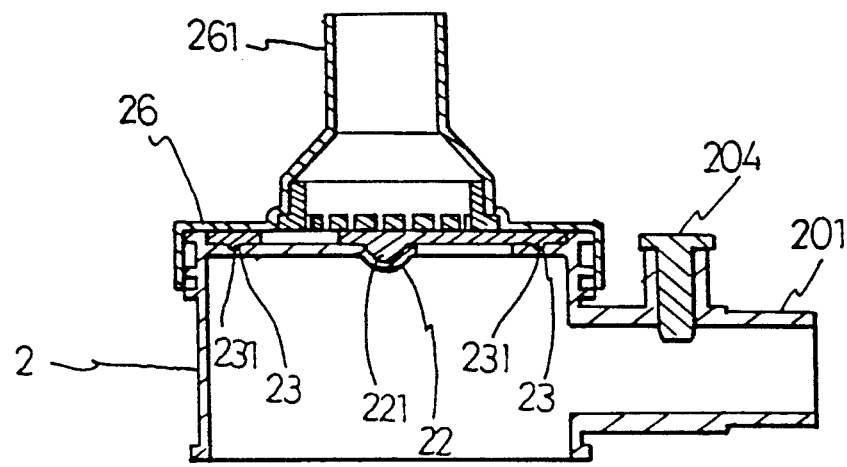
FIG. 5A is a sectional view showing the operation of the volume control device.
Figure 5B:
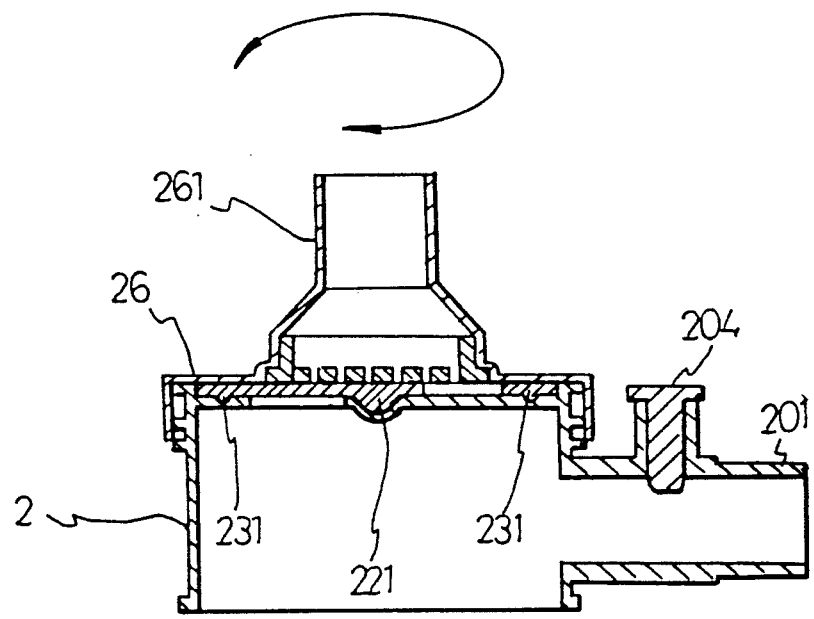
FIG. 5B is a sectional view showing the cap of the volume control device being turned with the engagement protrusions engaged with the adjacent recesses, producing click sound.
Figure 6:
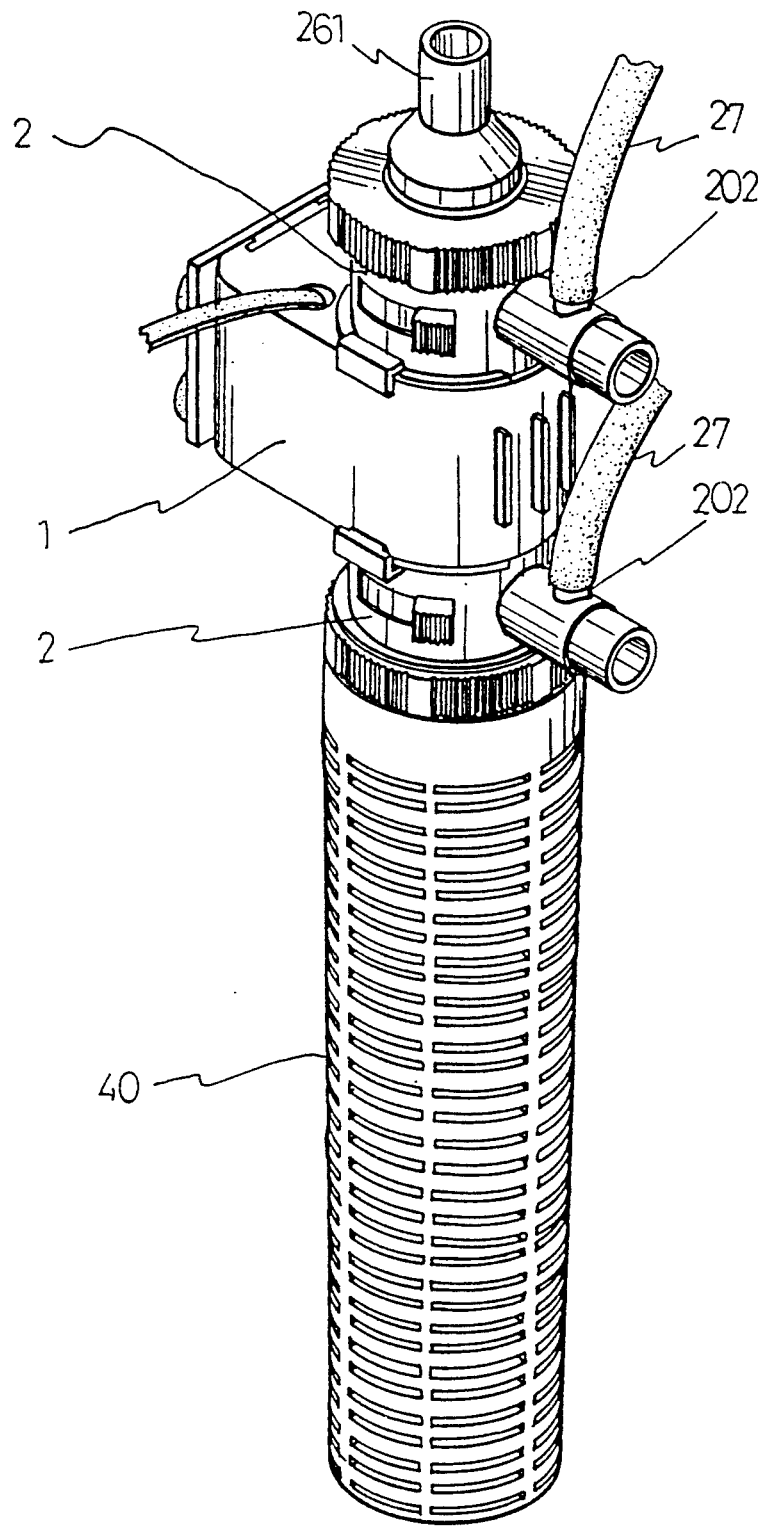
FIG. 6 is a diagram showing one pump unit being associated with a filter.
Figure 7:
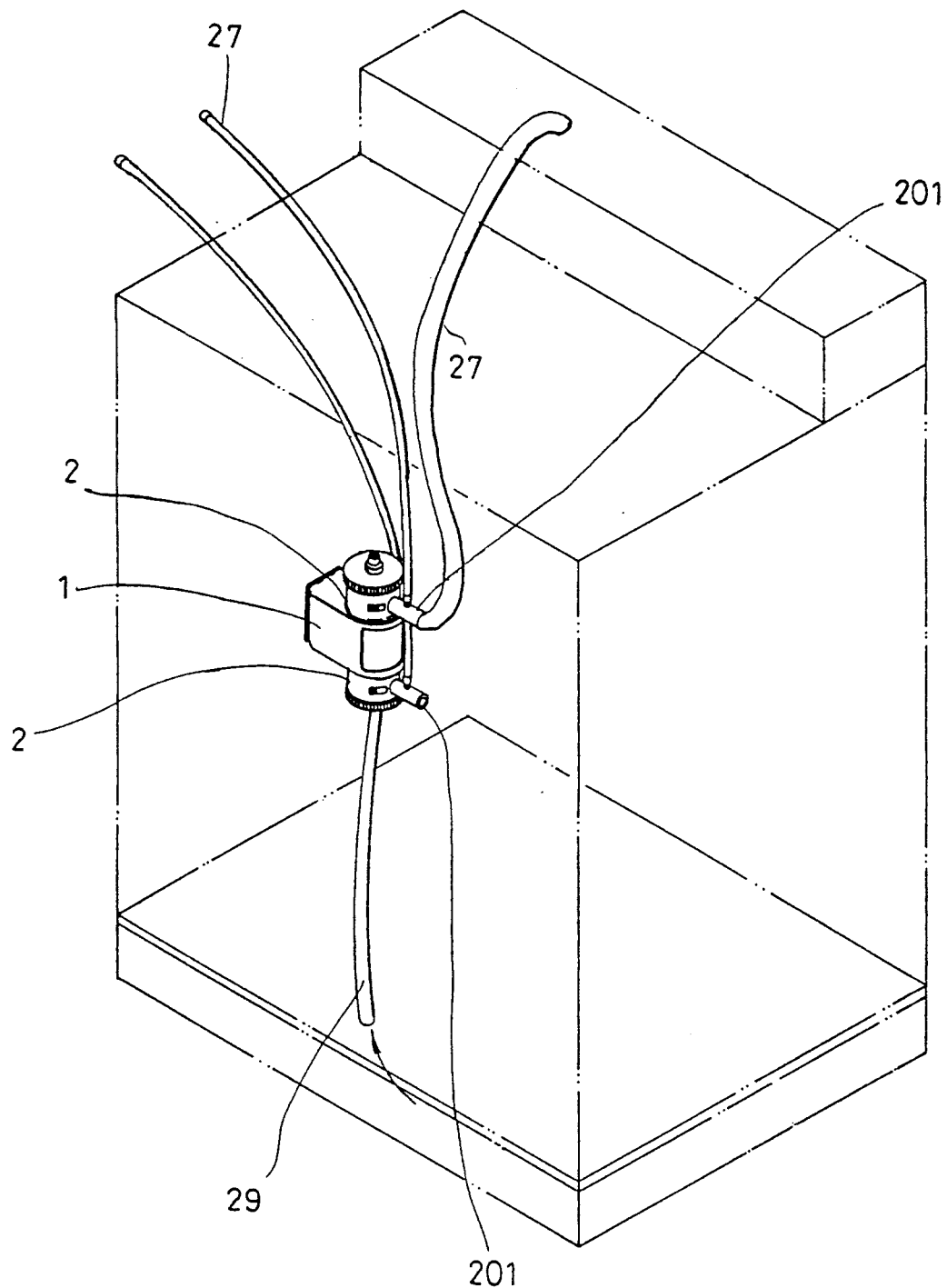
FIG. 7 is a diagram showing the tandem pump being equipped with a pair of air supply tubes and also connected to a water filtering means.
Figure 8:
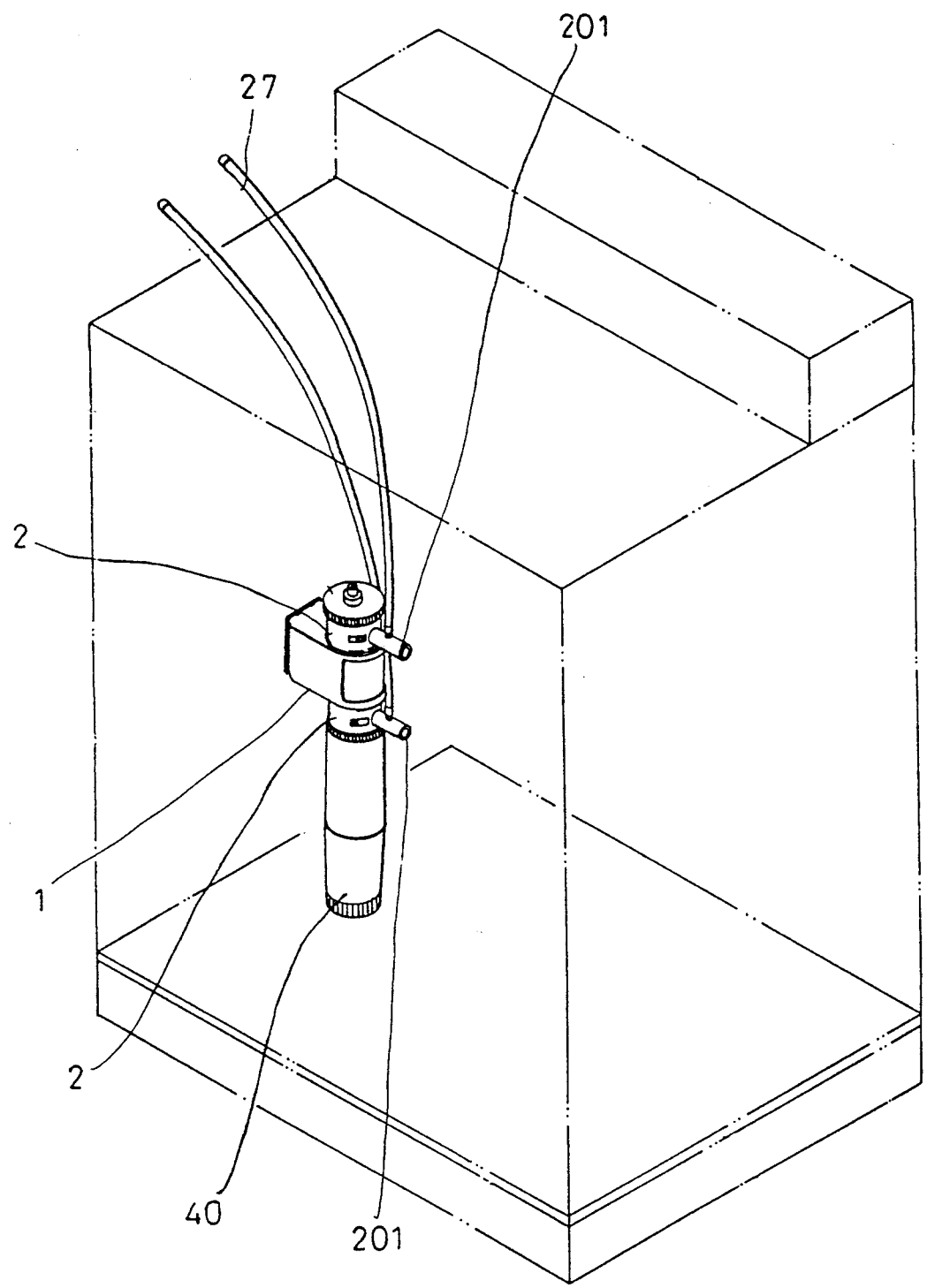
FIG. 8 is a diagram showing the tandem pump being associated with a filter.
Figure 9:
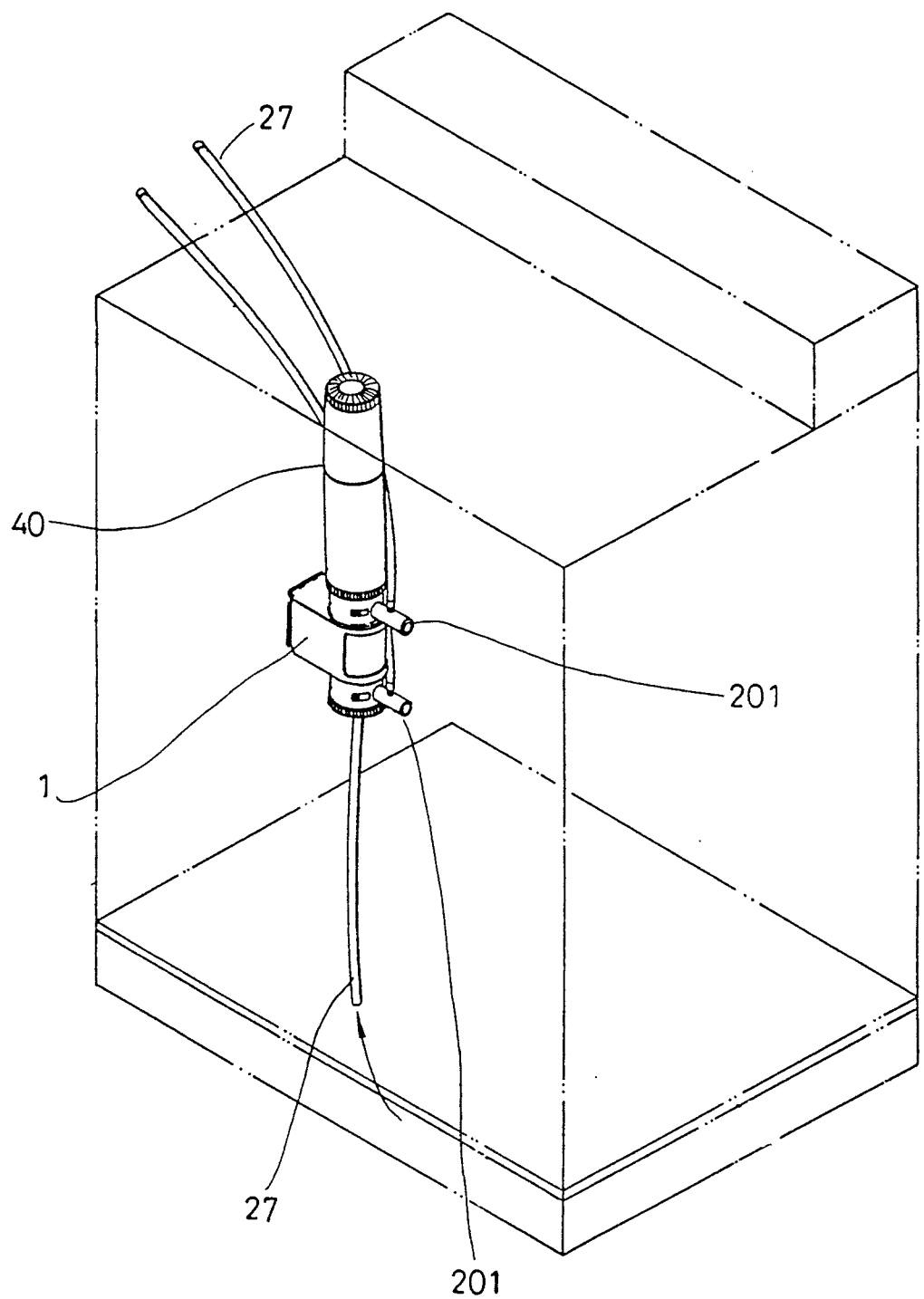
FIG. 9 is a diagram showing the tandem pump being equipped with a filter and a tube associated with each pump unit respectively.
Figure 10:
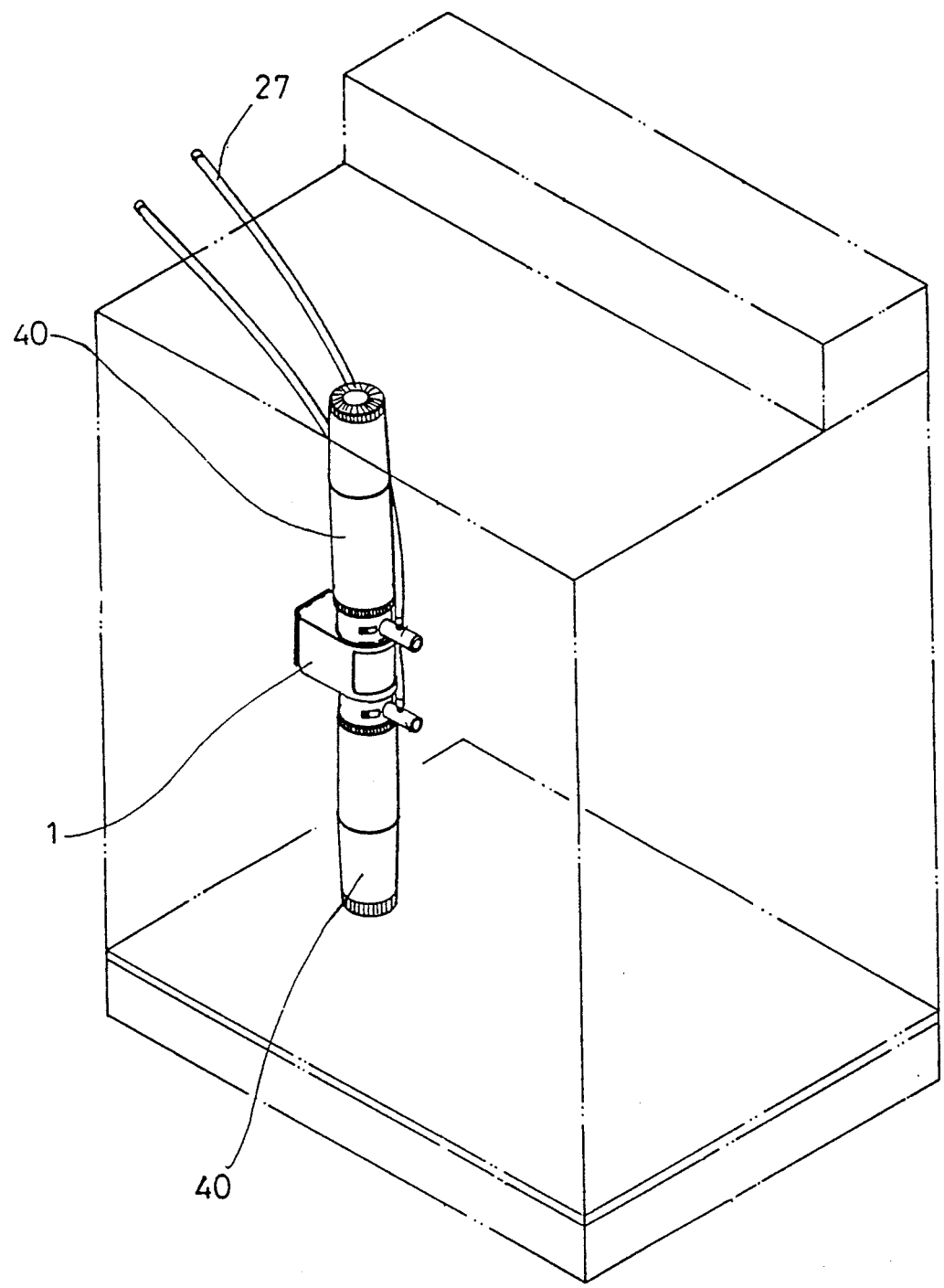
FIG. 10 is a diagram showing the pump units of the tandem pump being associated with a filter respectively.

As shown in FIGS. 5A, 5B, the protruded spots 231 disposed along the periphery of the underside of the disc 24 are engaged with the corresponding recesses 23 so as to keep the disc 24 retained in place. As the cap 26 is turned in either direction, the protruded spots 231 of the disc 24 will first be urged to disengage from the recesses and then come into consecutive engagement with the adjacent recesses again as the cap 26 is further turned so that the volume of the flow into the control chamber 2 is varied accordingly.

Referring to FIG. 2, each water outlet duct 201 communicates with the respective air intake tube 202 which can be sealed by a cork member 204 or can be connected to an elongated flexible tube 27 as shown in FIGS. 6, 7, 8, 9, 10, whereby fresh air or other kinds of gas can be introduced into water via the water outlet duct 201. When the outlet volume control button 203 is adjusted gradually to a closed position, the pressure of the dispensed water is accordingly increased so as to permit the flow to be injected farther, generating a turbulent projecting current in the container.

I claim:

1. A tandem pump for use in a fish globe, comprising:
   a pair of symmetrical pump units;
   a motor;
   a driving shaft having a propeller means at each end thereof being mounted to said motor and magnetically driven by the same;
   each pump unit further comprising:
   a cap having a water inlet;
   a filter disposed next to said cap;
   a control disc having a plurality of symmetric communication ports disposed thereon being located under said filter and integrally associated with said cap; a first sealing ring;
   a control chamber having an adjusting board disposed at one end thereof and equipped with an equal number of symmetric communication ports as said control disc; and an opening at the other end thereof; a water outlet duct extending from the wall thereof; an outlet water adjusting button being slidably movable so as to control the volume and pressure of water discharged via said water outlet duct;
   a second sealing ring; said water outlet duct communicating with an air intake tube which can be covered with a cork member;
   said motor being provided with a vertically defined and peripherally threaded flange at each end thereof so as to permit said control chamber to be removably mounted to said motor;
   a pair of retaining members being disposed adjacent to each said vertically defined and peripherally threaded flange of said motor whereby said control chamber having a horizontal flange defined on the periphery of said opened end can be firmly secured in place;
   said driving shaft being housed in a through hole of said motor and being driven magnetically;
   said propeller means of said driving shaft being housed in said control chamber through said opened end;
   each said pump unit being mounted to one end of said motor; said control disc being engaged with said cap so that the turning of said cap causes the relative motion of said disc against said adjusting board, making said communication ports of said disc and said adjusting board come into or out of alignment with each other or to any position therebetween so as to vary the volume of water flowing into said control chamber;
   a cork member being removably engaged with said air intake tube.

2. The tandem pump as claimed in claim 1 wherein said control disc is provided with a plurality of protrusion spots on the periphery of the underside thereof with a plurality of corresponding recesses disposed on the periphery of said adjusting board so that said disc can be turned along with said cap and produce click sound every time said protrusion spots come into engagement with said recesses in adjusting operation.

3. The tandem pump as claimed in claim 1 wherein each water outlet duct of said control chamber is provided with an air intaking tube which can be coupled to a gas supplier with a flexible tube means or be connected to atmosphere so that air or different kinds of gas can be pumped into water in a fish globe.

4. The tandem pump as claimed in claim 1 wherein one of said control discs are selectively capable of totally closing said communication ports, permitting water to be pumped in via only one pump unit.

5. The tandem pump as claimed in claim 1 wherein one of said water outlet ducts of said control chamber comprises means for selectively closing said outlet, permitting water to be discharged via only one of said pump units.

* * * * *